(12) United States Patent
Wigren et al.

(10) Patent No.: US 11,272,403 B2
(45) Date of Patent: Mar. 8, 2022

(54) CONTROL LINK DEFINITION IN NETWORKED CONTROL SYSTEM

(71) Applicant: Telefonaktiebolaget LM Ericsson (publ), Stockholm (SE)

(72) Inventors: Torbjörn Wigren, Uppsala (SE); Johan Bergman, Stockholm (SE); Ari Kangas, Lidingö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 458 days.

(21) Appl. No.: 16/088,687

(22) PCT Filed: Mar. 30, 2016

(86) PCT No.: PCT/SE2016/050260
§ 371 (c)(1),
(2) Date: Sep. 26, 2018

(87) PCT Pub. No.: WO2017/171592
PCT Pub. Date: Oct. 5, 2017

(65) Prior Publication Data
US 2020/0305029 A1 Sep. 24, 2020

(51) Int. Cl.
*H04W 28/24* (2009.01)
*H04W 4/70* (2018.01)
(Continued)

(52) U.S. Cl.
CPC ............ *H04W 28/24* (2013.01); *H04W 4/70* (2018.02); *H04W 8/24* (2013.01); *H04W 28/0257* (2013.01); *H04W 28/0268* (2013.01)

(58) Field of Classification Search
CPC ......... H04W 28/24; H04W 4/70; H04W 8/24; H04W 28/0257; H04W 28/0268;
(Continued)

(56) References Cited

U.S. PATENT DOCUMENTS

| 2003/0199997 A1* | 10/2003 | Gao ................. G05B 5/01 700/18 |
| 2010/0057485 A1* | 3/2010 | Luft ................. H04W 12/12 455/411 |
| 2011/0314145 A1* | 12/2011 | Raleigh ............ H04L 41/0893 709/224 |
| 2012/0307764 A1* | 12/2012 | Zhao ............... H04W 4/70 370/329 |

(Continued)

FOREIGN PATENT DOCUMENTS

WO   WO 2012/025825 A2   3/2012

OTHER PUBLICATIONS

"Control and Scheduling Co-Design of Networked Control System: Overview and Directions", Zh-Wen Wang & Hong-Tao Sun, IEEE, 2012 (Year: 2012).*

(Continued)

*Primary Examiner* — Habte Mered
(74) *Attorney, Agent, or Firm* — Sage Patent Group (57) ABSTRACT

The present disclosure relates to methods and nodes configured for control link definition in a networked control system, wherein the networked control system comprises a controlling node, a controlled process node and a Machine Type Communication, MTC, wireless communication link between the controlling node and the controlled process node. The method comprises to obtain process characteristics for a process performed in the controlled process node and NCS requirements for an automatic control process to be performed in the NCS. The controlling node also determines link capability requirements for the MTC wireless communication link based on the process characteristics and the NCS requirements. One or more quality of service, QoS, parameters of the MTC wireless communication link are customized based on the determined link capability requirements.

11 Claims, 7 Drawing Sheets

(51) Int. Cl.
*H04W 8/24* (2009.01)
*H04W 28/02* (2009.01)

(58) Field of Classification Search
CPC ....... H04L 47/26; H04L 47/283; H04L 47/14; H04L 41/142; H04L 41/0823; H04L 41/5025
See application file for complete search history.

(56) References Cited

U.S. PATENT DOCUMENTS

| | | | |
|---|---|---|---|
| 2013/0003576 A1 | 1/2013 | Segura et al. | |
| 2013/0007234 A1* | 1/2013 | Bartfai-Walcott | H04L 67/10 709/223 |
| 2016/0255458 A1* | 9/2016 | Huang | H04W 48/20 370/338 |
| 2018/0054248 A1* | 2/2018 | Kahtava | H04W 40/12 |

OTHER PUBLICATIONS

Towards Ubiquitous Massive Accesses in 3GPP Machine-to-Machine Communications, Lien et al, IEEE, 2011 (Year: 2011).*
Supplementary European Search Report for European Patent application EP 16 89 7240 dated Mar. 13, 2019, 3 Pages.
International Search Report and Written Opinion of the International Searching Authority, PCT/SE2016/050260, dated Dec. 14, 2016, 13 pages.
Mahmoud, M. S., "Wireless Networked Control System Design: An Overview," 2014 IEEE 23$^{rd}$ International Symposium on Industrial Electronics (ISIE), Jun. 1-4, 2014, Istanbul, Turkey, pp. 2335-2340.
3rd Generation Partnership Project; Technical Specification Group Services and System Aspects; Service requirements for machine-type communications; Stage 1 (Release 10), 3GPP TS 22.368 V1.1.1 (Nov. 2009), 23 pages.
Office Action issued in corresponding EP Application No. 16897240.4 dated Apr. 1, 2019, 09 Pages.

* cited by examiner

CONTROL LINK DEFINITION IN NETWORKED CONTROL SYSTEM

CROSS REFERENCE TO RELATED APPLICATIONS

This application is a 35 U.S.C. § 371 national stage application of PCT International Application No. PCT/SE2016/050260 filed on Mar. 30, 2016, the disclosure and content of which is incorporated by reference herein in its entirety.

TECHNICAL FIELD

The present disclosure relates to methods and nodes configured for control link definition in a networked control system, wherein the networked control system comprises a controlling node, a controlled process node and a Machine Type Communication, MTC, wireless communication link between the controlling node and the controlled process node.

BACKGROUND

3GPP Long Term Evolution, LTE, is the fourth-generation mobile communication technology standard developed within the 3rd Generation Partnership Project, 3GPP, to improve the Universal Mobile Telecommunication System, UMTS, standard to cope with increasing requirements in terms of improved services such as higher data rates, improved efficiency, and lowered costs. LTE-Advanced and the fifth-generation, 5G, mobile communication technology standards are developed to meet further requirements in terms of improved services. One of the main tasks for 5G is to reduce latency, and improve throughput and capacity compared to LTE. This is achieved by increasing the sample rate and bandwidth per carrier. 5G is also focusing on use of higher carrier frequencies i.e. above 5-10 GHz In a typical cellular radio system, wireless devices or terminals also known as mobile stations and/or User Equipment units, UEs, communicate via a Radio Access Network, RAN, to one or more core networks. The Universal Terrestrial Radio Access Network, UTRAN, is the radio access network of a UMTS and Evolved UTRAN, E-UTRAN, is the radio access network of an LTE system. In an UTRAN and an E-UTRAN, a UE is wirelessly connected to a Radio Base Station, RBS, commonly referred to as a NodeB, NB, in UMTS, and as an evolved NodeB, eNB or eNodeB, in LTE. An RBS is a general term for a radio network node capable of transmitting radio signals to a UE and receiving signals transmitted by a UE.

In LTE evolution and in future 5G systems, one goal is to open up for new use cases involving advanced applications of automatic control. Automatic control is a field of science focused on getting systems and processes to behave as intended and according to specification, despite shortcomings in e.g. mechanical design, motor performance and sensor accuracies. Automatic control algorithms can be based on feedback or feedforward or both.

Of special interest here is a technology denoted networked control systems, NCS, where the controller and the controlled process are located at different sides of an interface, typically a wireless interface connecting a controlling node, e.g., an RBS, and a controlled process node, e.g., a UE, by means of a wireless communication link. The real-time requirements of the communication links may vary significantly between different applications. Control of robots for component mounting on printed circuit boards have bandwidths approaching a kHz and cannot tolerate delays of more than a fraction of a millisecond when operated remotely over wireless interfaces. The same is true for industrial robots and e.g. ABS brakes in cars. On the other hand, crane control for container logistics in ports has bandwidths of the order of seconds, and these systems can tolerate much longer delay.

LTE architecture can provide a desired Quality of Service, QoS, for a wide range of services and this will also be the case for the 5G mobile communication standards. However, for control applications the requirements of each controlled process may be quite unique and in a networked control system implying a need for specific communication link characteristics. Present architecture and QoS definitions do not make provisions for the specific requirements following from a networked control system, NCS.

SUMMARY

In an application involving a networked control system, characteristics of the wireless communication link affect the overall controller process; thus, there is a need for improving and adapting capabilities of the communication link in order to achieve intended process dynamics in the controlled process.

It is an object of the present disclosure to configure a network control system in support of a particular controlled process. In particular, it is an object of the disclosure to provide embodiments supporting configuration of the wireless communication link between a controlling node and a controlled process node.

This object is obtained by a method, performed in a controlling node, for configuring a networked control system, NCS, comprising the controlling node, a controlled process node and a Machine Type Communication, MTC, wireless communication link between the controlling node and the controlled process node. The method comprises to obtain process characteristics for a process performed in the controlled process node and NCS requirements for an automatic control process to be performed in the NCS. The controlling node also determines link capability requirements for the MTC wireless communication link based on the process characteristics and the NCS requirements. One or more quality of service, QoS, parameters of the MTC wireless communication link are customized based on the determined link capability requirements.

The proposed solution enables improved control and reliability in control of a process controlled from a networked control system. The MTC wireless communication link is appropriately set, providing for a resource effective utilization. Furthermore, performing the link setting procedure from the controlling node provides for network operator control of the link setting procedure, combining input from the process operator and control system operator in order to optimize utilization of network resources while providing a customized wireless communication link. Finally, an automated method of configuring the NCS, allows an automatic and consistent large scale deployment of controllers to processes in need of automatic control; providing for critical MTC applied to automatic control.

According to aspects of the disclosure, the obtaining of process characteristics comprises receiving process characteristics from the controlled process node, while the obtaining of NCS requirements comprises receiving NCS requirements from the controlled process node and/or from an NCS requirements repository having a communications interface to the controlling node.

Accordingly, process characteristics that are readily available to the controlled process node, e.g., through measurements in the controlled process node, are obtained from the controlled process node, while controller requirements are obtained where they are most readily available.

According to aspects of the disclosure, process characteristics comprise one or more of a cross over frequency, a process delay, a non-linearity, and a range of inputs and outputs of the process.

Thus, the configuration of the networked control system is based on process characteristics determined as characterizing from a perspective of controller design and in the determining of link quality requirements.

According to other aspects of the disclosure, the NCS requirements comprises one or more of a closed loop bandwidth, a closed loop static error, a static or dynamic closed loop disturbance suppression and a robustness to modelling errors.

Accordingly, in the configuration of the networked control system a number of common control requirements parameters have been identified as characterizing for controller design purposes and are taken into consideration as part of the proposed configuring.

According to further aspects of the disclosure, the link capability requirements comprises one or more of a maximum delay of the link, a sampling period, a maximum block error rate and a bandwidth/data rate of the link.

According to another aspect of the disclosure, the customizing comprises customizing Guaranteed Bit Rate (GBR) or non-Guaranteed Bit Rate (non-GBR), Priority Handling, Packet Delay Budget and/or Packet Error Loss.

Thus, the disclosed solution provides for customizing and controlling a number of well-known QoS aspects of the communications link, or rather for controlling QoS for radio bearers of the PDN connection within the Networked Control System.

According to an aspect of the disclosure, the method for configuring the NCS further comprises to initiate the MTC wireless communication link between the controlling node and the controlled process node and to provide one or more control signals to the controlled process node based on one or more feedback signals received from the controlled process node.

The object of the disclosure is also obtained by a computer program comprising computer program code which, when executed in a controlling node, causes the controlling node to execute the above disclosed method aspects.

The object of the disclosure is also obtained by a controlling node configured to support configuration of a networked control system, NCS, comprising the controlling node, a controlled process node and a Machine Type Communication, MTC, wireless communication link between the controlling node and a controlled process node. The controlling node comprises radio circuitry arranged for establishing the MTC wireless communication link; communications circuitry arranged to obtain process characteristics for a process to be performed in the controlled process node and NCS requirements for an automatic control process to be performed in the NCS; and processing circuitry arranged to determine link capability requirements for the MTC wireless communication link based on the obtained process characteristics and the NCS requirements; and customize one or more quality of service parameters of the MTC wireless communication link based on the determined link capability requirements.

The advantages and benefits presented in relation to method aspects above are of course also applicable to the computer program configured to execute the method and the controlling node, comprising the computer program.

Furthermore, the object of the disclosure is obtained by a method performed in a controlled process node, of supporting configuration of a networked control system, NCS, comprising the controlled process node, a controlling node and a Machine Type Communication, MTC, wireless communication link between the controlled process node and the controlling node. The method comprises receipt, from the controlling node, of one or more customized quality of service, QoS, parameters for the MTC wireless communication link, and establishment of at least one MTC wireless communication link to the controlling node.

According to an aspect of the disclosure, the method further comprises receipt, from the controlling node, of a request for process characteristics for a process to be performed in the controlled process node and NCS requirements for an automatic control process to be performed in the NCS. A response is sent to the controlling node comprising the requested process characteristics and NCS requirements.

A computer program comprising computer program code which, when executed in a controlled process node, causes the controlled process node to execute the above disclosed method aspects also provide the above stated object of the disclosure.

A controlled process node is configured to support configuration of a networked control system, NCS, comprising the controlled process node, a controlling node and a Machine Type Communication, MTC, wireless communication link between the controlled process node and a controlling node. The controlled node comprises communications circuitry and processing circuitry. The controlled process node is configured to receive, from the controlling node, one or more customized quality of service, QoS, parameters for the MTC wireless communication link and to establish at least one MTC wireless communication link to the controlling node.

The controlled node embodiments provide corresponding benefits to those described above for the controlling node.

The disclosed automatic procedure allows for consistent large scale deployment of controllers to processes in need of automatic control, thereby enabling critical a networked and distributed solution to automatic control in general.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

FIG. 1
 a. illustrates general principles of feedback control;
 b. illustrates general principles of feedback and feedforward control;

FIG. 3 a. illustrates a mathematical presentation of a networked control system
b. illustrates networked control system including feedback and feedforward control;

DETAILED DESCRIPTION

Aspects of the present disclosure will be described more fully hereinafter with reference to the accompanying drawings. The arrangements and methods disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the invention. As used herein, the singular forms "a", "an" and "the" are intended to include the plural forms as well, unless the context clearly indicates otherwise. It should be noted that the word "comprising" does not necessarily exclude the presence of other elements or steps than those listed. It should further be noted that any reference signs do not limit the scope of the claims, that the example embodiments may be implemented at least in part by means of both hardware and software, and that several "means", "units" or "devices" may be represented by the same item of hardware.

In the drawings and specification, exemplary embodiments are disclosed. However, many variations and modifications can be made to these embodiments. Accordingly, although specific terms are employed, they are used in a generic and descriptive sense only and not for purposes of limitation, the scope of the embodiments being defined by the following claims.

Automatic control is a field of science focused on getting systems and processes to behave as intended and specified, despite shortcomings in e.g. mechanical design, motor performance and sensor accuracies. Automatic control algorithms are usually based on feedback from the controlled process, feedforward utilizing measureable disturbances, or a combination. In general automatic control design problems are addressed in a number of steps including specification of system requirements for the controlled system, mathematical modeling of the controlled system, design of the controller using the specification and modelling, implementation of the controller and test and verification that the specifications are met.

Of special interest in this disclosure is a technology denoted networked control systems, NCS, where a controller and a controlled process are located at different sides of an interface, typically a wireless interface connecting a controlling node and a controlled process node, e.g., a robot configured for component mounting on printed circuit boards, an industrial robot, or a crane controller for container logistics in ports. The robot for component mounting on printed circuit boards cannot tolerate delays of more than a fraction of a millisecond when operated remotely over wireless interfaces. The same may be true for industrial robots. On the other hand, crane control for container logistics in ports have bandwidths of the order of seconds and can tolerate much longer delay.

Figure 1A:
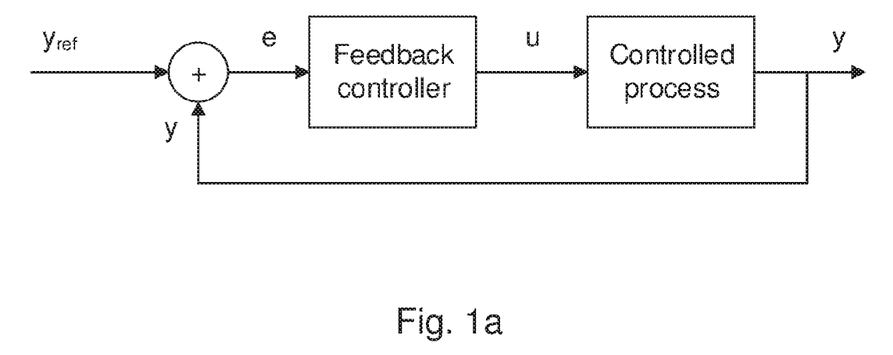

FIG. 1a illustrates general principles of feedback control. Here the control objective is to achieve a situation where the output y is tracking the reference signal $y_{ref}$ as closely as the specification requires, possibly subject to assumptions on the variation of the reference signal. The output y is therefore measured and fed back to the controller input where it is compared to the reference signal by formation of the control error $$e = y_{ref} - y.$$

The controller then uses the present and previous control errors together with previous control signals to produce the present control signal u. The fact that the previous control errors and control signals are used to generate the present control signal u makes the controller dynamic. This is needed since in general the controlled process is also dynamic. The dynamics is usually modeled by differential equations or difference equations. For linear systems, dynamics can also be handled in the frequency domain. Laplace or Fourier transformation is then used to obtain the frequency domain description. The control signal u affects the controlled process, which produces the output signal y, based on previous outputs and the present and previous control signals.

Figure 1B:
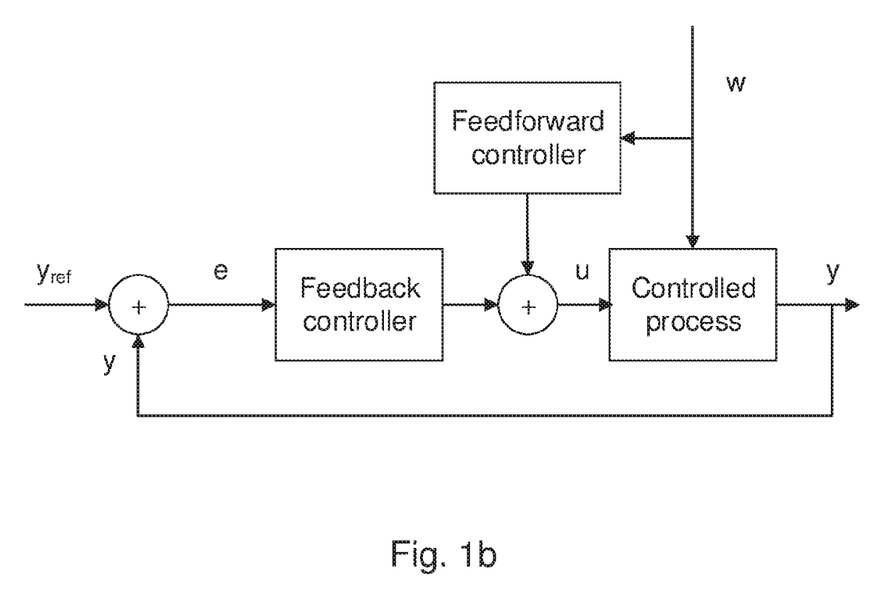

FIG. 1b illustrates general principles of a combination of feedback and feedforward control. A feedforward controller is added to the feedback parts of the control system. Feedforward becomes possible when a disturbance w that affects the system can be measured. Then the measurement can be fed to a feedforward controller that tries to compensate for the effect of the disturbance on the output signal before a feedback error has grown significantly. This way the feedback part of the controller does not need to regulate as big errors as it would have had to without feedforward. Technically this means that the feedback controller gain can be reduced which is beneficial for stability. A successful application of feedforward hinges on an accurate model of how the output is affected by the disturbance through the controlled process. This model is built into the feedforward controller that predicts the effect of the disturbance and itself on the output signal. The consequence is that the feedforward controller can (sometimes) be designed to produce the negative of the effect of the disturbance on the output via the system, thereby effectively cancelling the disturbance.

Networked Control Systems

Figure 2:
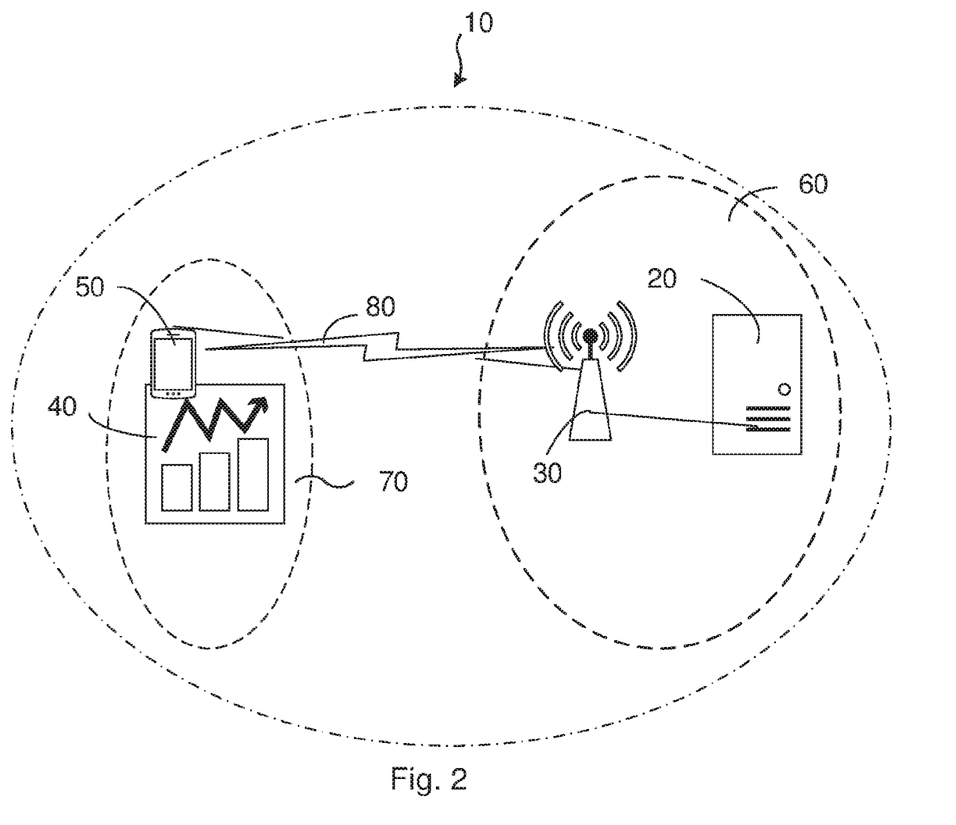
FIG. 2 is an example configuration of a network control system.

FIG. 2 illustrates a network configuration of a networked control system 10 comprising a controlling node 60 and a controlled process node 70 and a Machine Type Communication, MTC, wireless communication link between the controlling node and the controlled process node. In the controlled process node, an industrial application 40 is communicatively connected to a wireless device 50 having a wireless MTC link 80 to the controlling node 60. In accordance with aspects of the disclosure, the controlled process node 70 comprises a wireless device, or user equipment, UE, capable of transmitting and receiving data packets from a packet data network, PDN, over a wireless interface. It should be appreciated that the controlling node is not to be understood exclusively as a physical unit, but may just as well be a functional unit incorporated in one or several physical units comprising a radio base station.

In the disclosed deployment, the controlling node comprises a radio access point 30, e.g., an eNB, enabling communication of control instructions to the controlled process node 60. A remote server 20 has a wired packet data network, PDN, connection to the radio access point. Other configurations of the controlled process node and controlling node are of course also within the scope of the present disclosure. Furthermore, in accordance with future communication technologies, the controlling node may also be a multi-RAT node supporting a plurality of radio access technologies or a plurality of radio access nodes forming a combined cell.

Figure 3A:
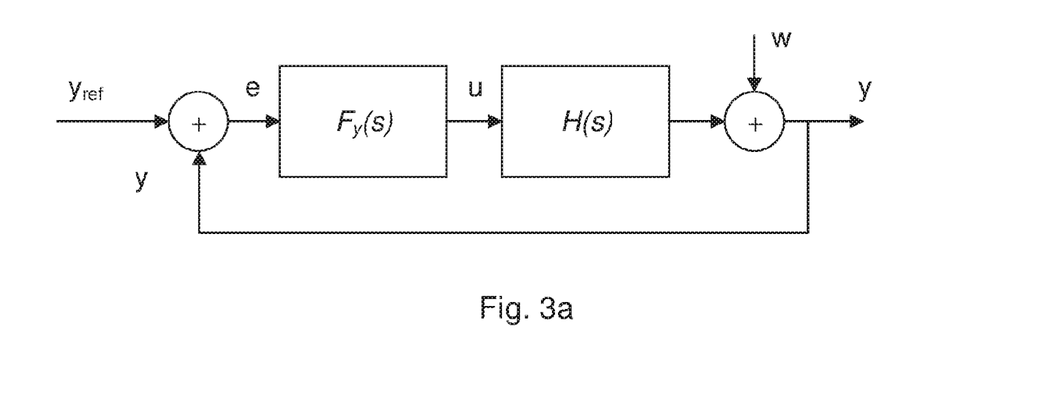
Figure 3B:
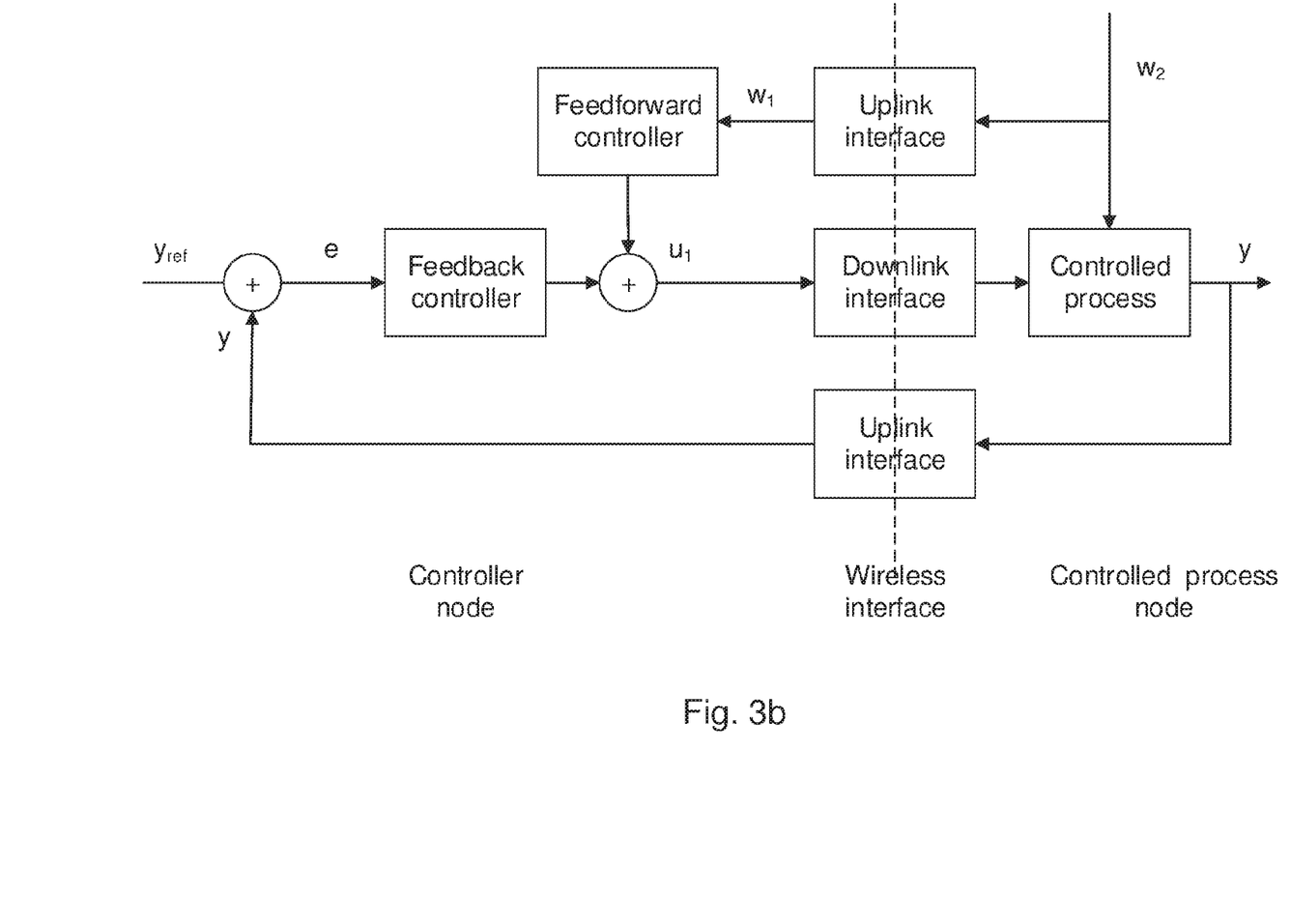

FIG. 3 illustrates the principles of feedback and feedforward control in a network control system, NCS. As can be appreciated from the disclosure in FIG. 2 and FIG. 3, there is a wireless interface between the controlling node and the controlled process node wherein the controlled process is performed. No interface will be perfect and therefore it affects the control signal in the downlink, while it also affects the measured output and the measured disturbance in the uplink. The impact on the signals for a wireless interface is typically in the form of a delay, or in the form of bit errors. More significant delays may be introduced over internet connections than over other wireless interfaces and connections.

When an LTE UE connects to a PDN EPS/E-RAB bearers are established between the Evolved Packet Core, EPC, and the radio access part. One bearer, the default bearer, is kept through the lifetime of the PDN connection to provide IP connectivity. In addition, dedicated bearers are established, where Quality of Service, QoS, can be controlled based on the end-to-end service requirements.

The LTE architecture can provide the desired QoS for a wide range of services, including e.g. mission critical push to talk with a latency of 60 ms. However it can be seen that the overall architecture does not cater for very low latencies of the order of a few ms that is required by some control applications. One reason is that the data needs to pass over several interfaces, where each interface adds delay due to the need to receive a complete packet and inspect it before routing the packet to the next node. Furthermore, other important parameters for controller applications are not included in the set of QoS parameters that have been negotiated and categorized by QoS Class Identifiers in present LTE architecture. Characteristics of the wireless interface affects the overall controlled process and needs to be adapted to it, in order not to change the controlled process dynamics so much that the specified performance is compromised.

The problems with prior art solutions of wireless systems is that there are no established procedures, signaling and algorithms, for determination of the suitable link characteristics when a new controller is to be set up over the typically wireless interface. There is therefore a need for the wireless systems to support specified methods, algorithms and signaling, for determination of suitable link characteristics, given control relevant process characteristics of the controlled process and controller requirements on the performance of the automatic control system Unless such procedures are made available, the use of the wireless interface in automatic control will in many situations be inefficient, or the application will perform too poorly.

Controller Link Parameters

Typical controller link parameters include
The typical and maximum link delay, uplink and downlink or combined.
The sampling period, uplink and downlink or combined.
The typical and maximum block error rate, uplink and downlink or combined.
The typical and minimum link bandwidth/data rate, uplink and downlink or combined.

While the present disclosure will present an embodiment of a control system with one input and one output, this is not limiting to the claimed scope of this disclosure. It is to be noted that most often systems have multiple inputs and multiple outputs. It may then be the case that different input and output signals need to be associated with different controller link parameters. The above four listed parameters and further parameters also apply to the case of multiple inputs and multiple outputs.

Process Characteristics

As stated above an accurate model is important for a good controller design, be it with feedback or feedforward or both. For the NCS case, the model needs to be made available for controller design and configured in the controlling node. Process characteristics to be addressed, at least in part, comprise:
Cross over frequency of the process: The crossover frequency is defined as the frequency where the open loop gain is 1. This parameter is closely related to the bandwidth, or dominating time constant of the open loop system, which may also be used. The cross over frequency is defined only with respect to the input signal.
The delay of the process, both with respect to the input and any measureable disturbance.
The nonlinearity of the process, both with respect to the input and any measureable disturbance. This can be expressed as a percentage.
The ranges of the inputs and outputs of the process including the measureable disturbance.
The bandwidth of the measureable disturbance.
More advance and complete process characteristics could be defined as
Transfer functions describing the process dynamics in terms of parameters related to the input, disturbance and output. Transfer functions can occur both in continuous time and discrete time. In the latter case also the sampling period $T_s$ would be needed.
Differential equations or in the discrete time case difference equations. These equations can be linear and non-linear. The equations would be characterized by parameters related to the input, disturbance and output.
Resolution of the inputs and outputs of the process may also be comprised in the process characteristics and considered parallel to the range of the inputs and outputs. The resolution describes the quantization and how fine this is within the range.

In summary, there are a large number of possibilities to characterize a process for controller design, and the above list represents some more common ways of representing process characteristics.

Controller Requirements

In order to design a controller, the process characteristics is not enough, the controller design also needs to account for the specifications. Therefore control requirement parameters need addressed, at least in part. Such control requirement parameters comprise:

The closed loop bandwidth. This determines how fast the response is with respect to changes in the reference signal.

The closed loop static error. This determines how accurate the regulation is, for a constant reference signal.

The static closed loop disturbance suppression. Sometimes the static case is considered, i.e. the case where a static disturbance and a static reference is applied to the system. In this case the disturbance suppression is characterized by the difference $y_{ref}-y$ after the transients have faded out. The disturbance may be measurable or unmeasurable.

The dynamic closed loop disturbance suppression. Classical control theory proves that the dynamic, or frequency dependent, disturbance suppression is coupled to the sensitivity function. This function depends on the feedback controller and the process dynamics. The sensitivity function is therefore characterized by the parameters of its transfer function.

The robustness with respect to modeling errors. Classical control theory proves that the robustness with respect to modeling errors is coupled to the complementary sensitivity function. This function depends on the feedback controller and the process dynamics. The complementary sensitivity function is therefore characterized by the parameters of its transfer function.

In summary, there are a large number of possibilities to characterize a process for controller design; the above list only contains some common ones.

Dynamic Process Representations

A dynamic process is one where the output depends not only on the present input signal but also on previous inputs and outputs; hence, the dynamic process has memory. The most basic dynamic process is the linear one that can be described by a differential equation as $$y^{(n)}(t)+a_1y^{(n-1)}(t)+\ldots+a_ny(t)=b_0u^{(m)}(t)+\ldots+b_mu(t)$$

Here y(t) is the output signal, u(t) is the input signal, t is the time, while $a_i$ i=1 ... n and $b_j$ j=0, ..., m are constant parameters. (i) denotes differentiation with respect to time i times. The above differential equation has order n, one input signal and one output signal. For simplicity all concepts are explained in this context, but the generalization to more than one input signal and more than one input signal is within the scope of the present disclosure and readily available to the person skilled in the art, e.g., through By taking Laplace transforms and setting initial values to zero, the differential equation is transformed to be represented by a transfer function H(s), where s denotes the Laplace transform variable which is closely related to the angular frequency used in Fourier transforms. The result is $$H(s) = \frac{B(s)}{A(s)} \bigg) \frac{b_0 s^m + \ldots + b_m}{s^n + a_1 s^{n-1} + \ldots + a_n}$$

The relation between the output signal and input signal Laplace transforms Y(s) and U(s) are $$Y(s)=H(s)U(s).$$

The poles $p_i$ i=1, ..., n of the process are given by the equation A(s)=0. For simplicity only strictly stable (open loop) processes with all poles in the left complex half plane is considered here. In general poles are real or complex conjugate pairs.

The properties of the dynamic process can also be studied in the frequency domain in terms of complex valued frequency functions Y(jω), H(jω) and U(jω). ω denotes the angular frequency that fulfils ω=2πf, where f is the frequency in Hz.

NCS Configuration

As mentioned above, in an application involving a networked control system, characteristics of the wireless communication link affect the overall controller process. A problem with prior art solutions for networked control systems is that there are no established procedures, signaling and algorithms, to configure a network control system in support of a particular controlled process taking communication link aspects into account. It is an object of the present disclosure to provide embodiments supporting configuration of the wireless communication link between a controlling node and a controlled process node and determining suitable link characteristics when a new controller is to be set up over a wireless interface, e.g., a 3GPP LTE, or future wireless 5G interface.

The present disclosure solves the above problem by disclosure of a method for NCS controller link customization. Turning to FIG. 2, the method is performed in a controlling node 60 that is arranged for configuring a networked control system 10, NCS, comprising the controlling node 60, a controlled process node 70 and a Machine Type Communication, MTC, wireless communication link 80 between the controlling node and the controlled process node.

Figure 4:
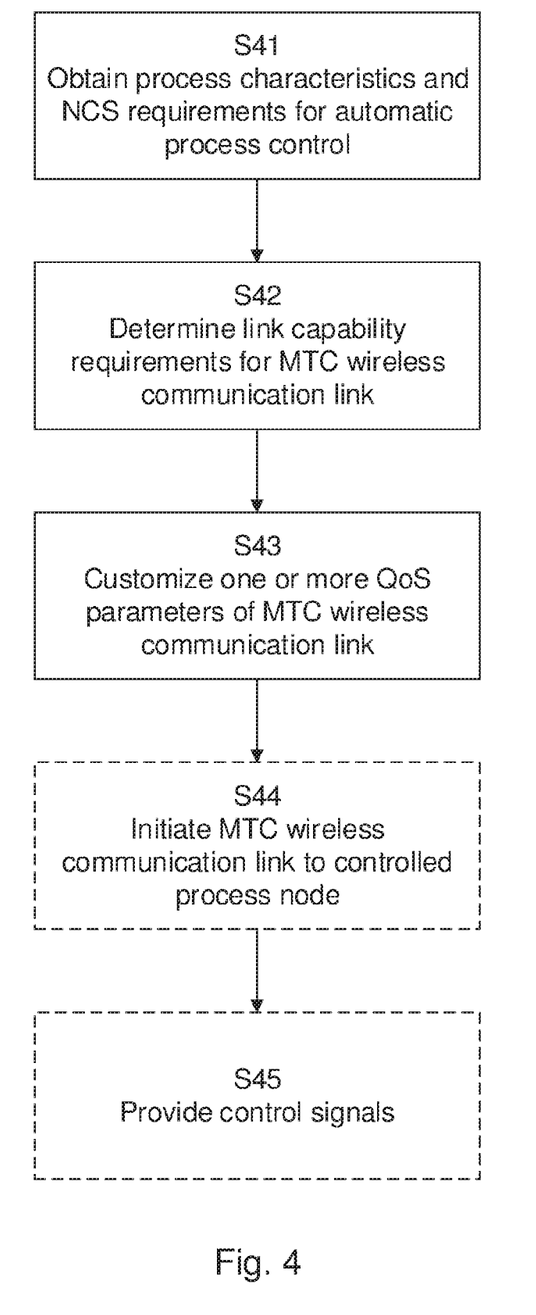
FIG. 4 is a flowchart illustrating embodiments of method steps performed in a controlling node.

FIG. 4 is a flowchart illustrating embodiments of method steps performed in a controlling node. The method comprises to obtain S41, in the controlling node, e.g., an eNodeB, eNB or any other radio access point of wireless communication system, process characteristics for a process performed in the controlled process node, e.g., a wireless device such as a User Equipment, and NCS requirements for an automatic control process to be performed in the NCS. The controlling node also determines S42 link capability requirements for the MTC wireless communication link based on the process characteristics and the NCS requirements. Based on the determined link capability requirements, the controlling node customizes S43 one or more quality of service, QoS, parameters of the MTC wireless communication link 80.

According to an aspect of the disclosure, the automatic control process comprises feedback control and/or feedforward control. Thus, the present disclosure presents a centralized method wherein the controlling node determines and customizes the allocation of link resources over the wireless interface. This is achieved in the controlling node that is responsible for setting up the link over which closed loop control is performed. The controlling node also determines and runs the controller based on measurements performed on the process in the controlled process node. The controlled process is located in the controlled process node.

The invention discloses functionality necessary for setting up the downlink and uplink links. More specifically the invention provides a systematic setup of the controller link so that spectral resources are not wasted and the controller performance is as specified.

According to an aspect of the disclosure, the obtaining S41 of process characteristics comprises receiving process characteristics from the controlled process node. Process characteristics, e.g., characteristics attributable to the feedback, feedforward or combined control process, are readily available to the controlled process node and are transmitted to the controlling node, upon request or without solicitation.

This may be achieved as follows. The controlling node asks the controlled process node for process characteristics information and controller requirement information in a request message sent to the controlled process node. The request message may comprise information elements capable of encoding a list of requested process characteristics and a list of requested NCS requirements.

The process characteristics for the process performed in the controlled process node are provided to the controlling node in a response to the request; thus, the controlled process node responds to the controlling node with the requested information that is naturally available in the node where the controlled process is residing.

The NCS requirements, on the other hand, may be obtained within the controlled process node. Thus, in a first use case, the controlled process does not respond with any controller requirement information and the controlling node uses only controller requirement information retrieved within from within the node. This use case represents a client-server setup of the wireless link in which the controlled process node contributes with its process characteristics, and where the controlling node contributes with all the controller requirement information. This would be natural when the controlled process node has knowledge about it process characteristics, but not about its closed loop controlled performance.

According to an aspect of the disclosure, the obtaining of NCS requirements comprises receiving NCS requirements from the controlled process node and/or from an NCS requirements repository having a communications interface to the controlling node. Thus, controller requirement information may also be received in the response from the controlled process node. In a second use case, the controlled process node contributes with all process characteristics information and with all or some controller requirement information. Here the task of the controlling node would be to determine the link characteristics to best meet the requested controller requirements, considering the total amount of resources of the link controlled by the controlling node. Additional controller requirement information may also be requested from external entities. The controlling node can then perform a controller design, from which it can compute the needed requirements on link delay, sampling period, link bandwidth/data rate, and link block error rate. The link can then be set up with the usual link setup tools available in the wireless system. According to aspects of the disclosure, the process characteristics and the NCS requirements are retrieved over the wireless communications interface or over a wired communications interface, e.g., a wired communications interface to the PDN network. Retrieval over a wired communications interface may be the case where the information for link setup comes from another node than the node where the process is located. This other node could typically be located in the core network and connected e.g. to the controlling node. This means that the controlling node would not interrogate the controlled process node over the wireless interface over which the final control system would operate; rather it would interrogate the core network node over another interface. The information contents would however typically be the same as described above.

An accurate process model is important for a good controller design, be it with feedback, feedforward or a combination of the two. For the NCS case, the model needs to be made available for controller design somewhere and configured in the controlling node. According to aspects of the disclosure, process characteristics comprise one or more of a cross over frequency, a process delay, a non-linearity, and a range of inputs and outputs of the process; all representing process characteristics that may be required for appropriate controller design.

More advanced process characteristics are defined through the transfer functions describing the process dynamics in terms of parameters related to input, disturbance and output. Transfer functions occur both in continuous time and discrete time. In the latter case also the sampling period $T_s$ is required to describe the process dynamics.

Differential or difference equations also provide a representation of process characteristics. Such equations may be linear or non-linear and would be characterized by the above disclosed transfer function parameters, i.e. parameters related to input, disturbance and output.

The crossover frequency is the frequency $\omega_c$ where $|H(j\omega_c)|=1$ Note that the crossover frequency can contain the controller gain. The crossover frequency is seldom considered for closed loop cases.

The dominating pole(s) of the process is the one(s) closest to s=0, i.e. the pole(s) that represent the slowest decay. Mathematically the dominating pole(s) is given by:

$$i_{dominating} = \operatorname*{argmin}_i |p_i|$$

The dominating time constant is the time constant of the dominating pole, i.e the quantity:

$$T_{dominating}=1/P_{dominating}$$

The bandwidth of the process is defined as the frequency where the gain has fallen to $1/\sqrt{2}$, i.e 3dB. The bandwidth is most often used for closed loop systems. Mathematically the bandwidth is the frequency $\omega_{BW}$, such that:

$$|H(j\omega_{BW})|^2=(\tfrac{1}{2})|H(0)|^2.$$

The delay of the process is the time T such that the output of the process at time t is only a function of times $\tau \le t-T$.

The nonlinearity $\Phi$ of the process can e.g. be expressed relative to linearity as:

$$k_1 u \le \Phi(u) \le k_2 u$$

This is denoted a sector condition. Many other definitions are possible.

The range of a signal r(t) of the process is the interval of variation of the signal, i.e.

$$r(t) \in [r_{min}, r_{max}].$$

Turning to FIG. 3a, the closed loop system of FIG. 3a is computed as follows $$Y(s)=W(s)+H(s)F_y(s)(Y_{ref}(s)-Y(s)),$$

which gives $$Y(s) = \frac{F_y(s)H(s)}{1+F_y(s)H(s)} Y_{ref}(s) + \frac{1}{1+F_y(s)H(s)} W(s)$$

This gives the effect of the reference signal and the disturbance on the output.

Turning back to FIG. 4, NCS requirements for automatic process control are also obtained in step S41. According to aspects of the disclosure, such NCS requirements comprise one or more of a closed loop bandwidth, a closed loop static error, a static or dynamic closed loop disturbance suppression.

The closed loop bandwidth $\omega_{CL}$ of the control system is given by the equation $$\left|\frac{F_y(j\omega_{CL})H(j\omega_{CL})}{1+F_y(j\omega_{CL})H(j\omega_{CL})}\right|^2 = \frac{1}{2}\left|\frac{F_y(0)H(0)}{1+F_y(0)H(0)}\right|^2$$

The closed loop static error of the control system is given by the equation $$y_{ref} - y = \frac{1}{1+F_y(0)H(0)}(y_{ref} - w)$$

The static closed loop disturbance suppression of the control system is given by the static sensitivity function $$S(0) = \frac{1}{1+F_y(0)H(0)}.$$

The dynamic closed loop disturbance suppression of the control system is determined by the sensitivity function $$S(j\omega) = \frac{1}{1+F_y(j\omega)H(j\omega)}$$

A complimentary sensitivity function of the control system $T(j\omega)=1-S(j\omega)$ determines the robustness of the control system with respect to un-modelled dynamics.

The link capability requirements for the MTC communication link are determined in step S42, based on the obtained process characteristics and NCS requirements. According to an aspect of the disclosure, such link capability requirements comprises one or more of a maximum delay of the link, a sampling period, a maximum block error rate and a bandwidth/data rate of the link. While the disclosure is provided for a situation with a network controlled system having one input and one output, the principles of the present disclosure are equally applicable to a situation of multiple inputs and outputs. In fact, most often systems do have multiple inputs and multiple outputs. It may then be the case that different input and output signals need to be associated with different control link parameters.

When determining link capability requirements, the overall architecture of the networked control system must be taken into account. The conventional LTE architecture is designed for seamless IP connectivity between a wireless device and a PDN. The architecture comprises a radio access part in the Radio Access Network, RAN, and a non-radio access part in the Evolved Packet Core, EPC. When a wireless device connects to a PDN, radio bearers, e.g., EPS/E-RAB bearers, are established between the EPC and the RAN. The LTE architecture can provide desired link capabilities and QoS for a wide range of services. However, the overall architecture may not be adequate for very low latencies of the order of a few ms that may be required by some control applications. One reason for the inadequacy to support low latencies may reside in the passing of data over a plurality of interfaces in the PDN, where each interface adds delay. The link capability requirements must be determined taking these additional delays into account, so that the latency is maintained within acceptable limits. A consequence of this, is that prior art negotiated QoS parameters are not sufficient for the application of a networked control system. The needed requirements on link delay, sampling period, link bandwidth/data rate and link block error rates are determined by the controlling node based on the obtained process characteristic and NCS requirements.

According to one example embodiment, a maximum round trip time of the MTC wireless communication link is determined as one link capability requirement. The controlling node computes the allowed round trip time of the link as the latency that keeps the phase loss p over the link below a pre-specified value-$\rho_{max}$, at the required bandwidth $\omega$. The computing is then Arg($e-j^\omega T$)<–$^\psi$max which gives $T$<tan–1($^\psi$max)/$^\omega$ According to another example embodiment, a sampling period is determined as a link capability requirement. The controlling node first computes the allowed round trip time, this can e.g. be done as in the embodiment described above, although other alternatives exist as well. Since a sampling period $T_s$ introduces an additional delay affecting the control loop, the sampling period is determined to be a factor k below the round trip time, i.e. $T_s$=kT where k is a small number, typically below 0.1.

According to still another example embodiment, a maximum block error rate is determined as a link capability requirement. The controlling node may typically use pre-computed tables of allowed block error rates, typically as a function of other NCS requirements, like the required bandwidth. This way, alternative NCS settings that meet the overall requirements can be selected in a flexible way. The tables would have to be determined off-line in performance simulations.

According to still another example embodiment, a bandwidth/data rate of the MTC link is determined as a link capability requirement. Given the needed range and resolution of control, feedback and feedforward signals transmitted over the link, also the number of bits that needs to be transmitted to communicate control, feedback and feedforward signal at one sampling instance is known. If these number of bits is denoted B, it follows that the data rate accounting for the sampling period and block error rate is B/($T_s$(1–BLER)), where BLER is the block error rate.

In step S43 one or more quality of service, QoS, parameters of the MTC wireless communication link are customized based on the determined link capability requirement. According to aspects of the disclosure, the customizing S43 comprises customizing QoS parameters relevant for radio bearers of the PDN, i.e., determining QoS parameters that need controlling in order to fulfil end-to-end service requirements. The customizing of the QoS parameters of the MTC wireless communication link completes a link quality definition procedure essential for configuring the NCS. The link capability requirements include uplink and downlink requirements that may be separately determined and defined.

Following an initializing S44 of the MTC wireless communication link between the controlling node and the controlled process node the networked control system will be fully operable whereby the controlling node provides S45 one or more control signals to the controlled process node based on one or more feedback signals received from the controlled process node.

Consequently, FIG. 4 and the above detailed description based on FIG. 4 presents a new centralized MTC controller link quality definition procedure performed in a controlling node, e.g., an eNB or other network node, for a networked control system comprising a controlled process node, typically a wireless device, at the other end of a wireless interface. The controlling node is set up to receive a request to set up network control system, over a wireless interface, or to receive a request to perform a MTC controller link quality definition procedure, i.e., customizing QoS parameters for an MTC wireless communications link. The procedure will involve signaling between the controlling node and the controlled process node, as will be explained in detail with reference to FIG. 8.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed in FIG. 4. The particular sequence of such executable instructions or associated data structures represents examples of corresponding acts for implementing the functions described in such steps or processes.

Figure 5:
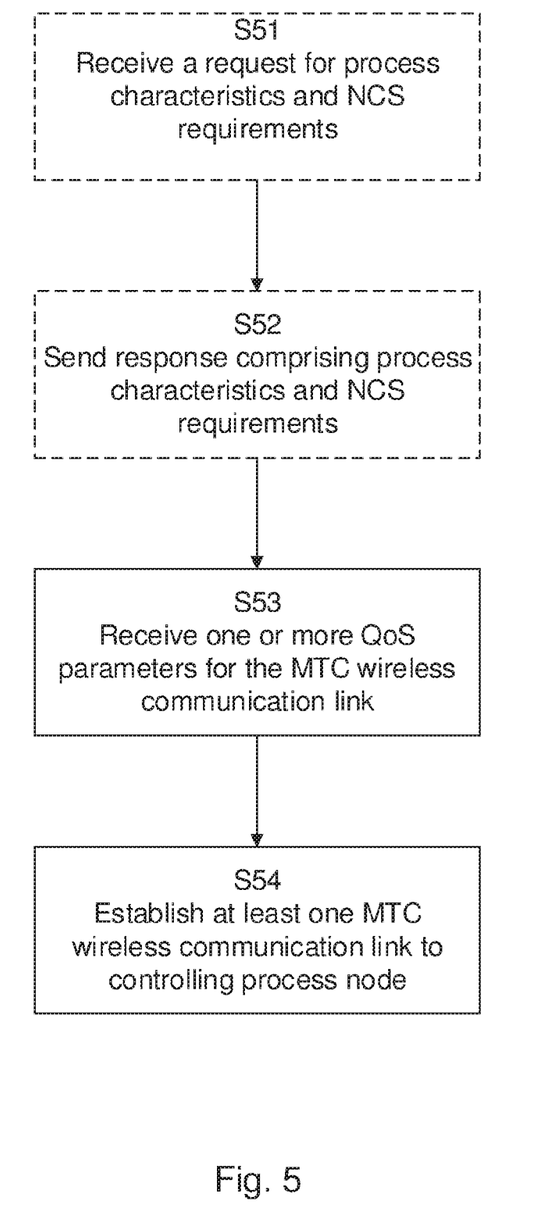
FIG. 5 is a flowchart illustrating embodiments of method steps performed in a controlled process node.

FIG. 5 is a flowchart illustrating embodiments of method steps performed in a controlled process node, of supporting configuration of a networked control system, NCS, comprising the controlled process node, a controlling node and a Machine Type Communication, MTC, wireless communication link between the controlled process node and the controlling node, the method comprises to receive S53, from the controlling node, one or more customized quality of service, QoS, parameters for the MTC wireless communication link, and to establish S54 at least one MTC wireless communication link to the controlling node. The QoS parameters are QoS parameters relevant for radio bearers of packet data communication in the NCS in order to fulfil end-to-end service requirements. The customizing of the QoS parameters of the MTC wireless communication link completes a link quality definition procedure essential for configuring the NCS. The link capability requirements include uplink and downlink requirements that may be separately determined and defined.

According to an aspect of the disclosure, the method performed in the controlled process node further comprises to receive S51, from the controlling node, a request, for process characteristics for a process to be performed in the controlled process node and NCS requirements for an automatic control process to be performed in the NCS; and to send S52 a response to the controlling node comprising the requested process characteristics and NCS requirements. Following initiating of the MTC wireless communication link, the method performed in the controlled process node further comprises to retrieve one or more output signals from a process performed in the controlled process node and to send the retrieved one or more output signals to the controlling node. Control signals for controlling the process performed in the controlled process node are received from the controlling node so that automatic process control comprising feedback, feedforward or a combination of feedback and feedforward is performed in the networked control system comprising the controlled process node, the controlling node and the MTC wireless communications link.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed in FIG. 5. The particular sequence of such executable instructions or associated data structures represents examples of corresponding acts for implementing the functions described in such steps or processes.

Figure 6:
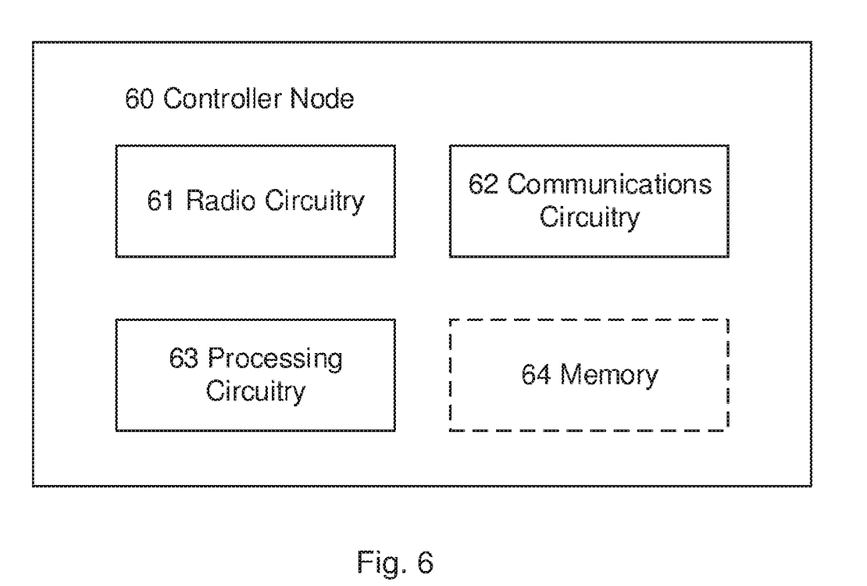
FIG. 6 is an example configuration of a controlling node according to some of the example embodiments.

FIG. 6 is an example configuration of a controlling node according to some of the example embodiments. The illustrated controlling node 60 is an example of an eNodeB which may incorporate some of the example embodiments discussed above. The controlling node is configured to support configuration of a networked control system, NCS, comprising the controlling node, a controlled process node and a Machine Type Communication, MTC, wireless communication link between the controlling node and a controlled process node. As disclosed in FIG. 6, the controlling node comprises radio circuitry 61 arranged for establishing the MTC wireless communication link. It should be appreciated that the radio circuitry 51 may be comprised as any number of transceiving, receiving, and/or transmitting units or circuitry. It should further be appreciated that the radio circuitry 61 may be in the form of any input/output communications port known in the art.

The controlling node further comprises communications circuitry 62 arranged to obtain process characteristics for a process to be performed in the controlled process node and NCS requirements for an automatic control process to be performed in the NCS, e.g., over the wireless interface, over an X2 interface or over any suitable interface. It should further be appreciated that the communications circuitry 62 may be in the form of any input/output communications port known in the art.

Processing circuitry 63 is arranged in the controlling node to determine link capability requirements for the MTC wireless communication link based on the obtained process characteristics and the NCS requirements and to customize one or more quality of service parameters of the MTC wireless communication link based on the determined link capability requirements. The processing circuitry may be any suitable type of computation unit, e.g. a microprocessor, digital signal processor (DSP), field programmable gate array (FPGA), or application specific integrated circuit (ASIC) or any other form of circuitry. It should be appreciated that the processing circuitry need not be provided as a single unit but may be provided as any number of units or circuitry.

It should be understood that entities in the drawings, e.g., blocks of the block diagrams, and also combinations of entities in the drawings, can be implemented by computer program instructions, which instructions can be stored in a computer-readable memory, and also loaded onto a computer or other programmable data processing apparatus. Such computer program instructions can be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

In some implementations and according to some aspects of the disclosure, the functions disclosed as performed in a certain order in a block of the block diagram can occur out of the order.

Figure 7:
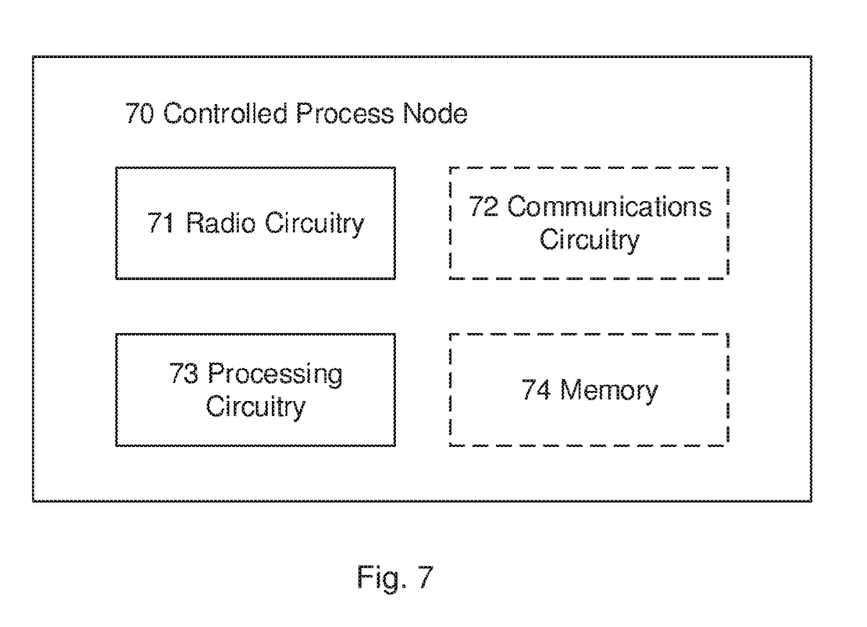
FIG. 7 is an example configuration of a controlled process node according to some of the example embodiments.

FIG. 7 is an example configuration of a controlled process node 70 according to some of the example embodiments. The illustrated controlled process node 70 is an example of an eNodeB which may incorporate some of the example embodiments discussed above. The controlled process node is configured to support configuration of a networked control system, NCS, comprising the controlled process node, a controlling node and a Machine Type Communication, MTC, wireless communication link between the controlling node and a controlled process node. As disclosed in FIG. 7, the controlled process node comprises radio circuitry 71 arranged for establishing the MTC wireless communication link. It should be appreciated that the radio circuitry 71 may be comprised as any number of transceiving, receiving, and/or transmitting units or circuitry. It should further be appreciated that the radio circuitry 71 may be in the form of any input/output communications port known in the art.

The controlled process node 70 further comprises radio circuitry 71 and processing circuitry 73; wherein the controlled process node is configured to receive, from the controlling node, one or more customized quality of service, QoS, parameters for the MTC wireless communication link; and establish at least one MTC wireless communication link to the controlling node.

Figure 8:
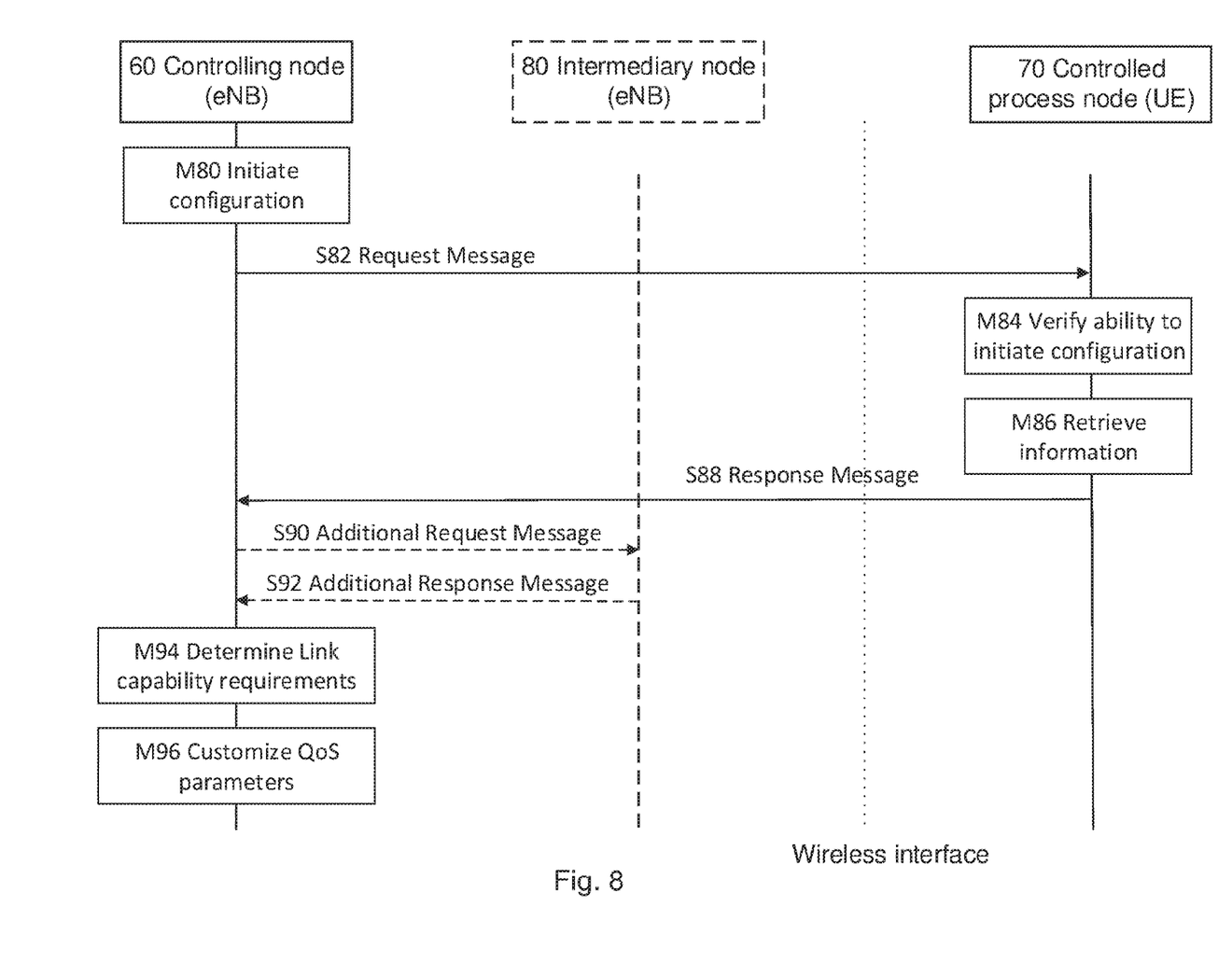
FIG. 8 is an example signaling diagram of signaling in a networked control system.

FIG. 8 discloses an example signaling diagram of signaling in a networked control system. A controlling node 60, e.g., an eNB, is connected to a controlled process node 70, e.g., a UE, by means of an MTC wireless communications link. Signaling between the controlling node and the controlled process node is performed in order to configure a networked control system comprising the controlling node, the controlled process node and the MTC wireless communication link. The process may be initiated following receipt in the controlling node of a request to set up a networked control system or to perform an MTC link quality definition procedure. As a first measure M80, the controlling node initiates a configuration procedure, directed to configuring the networked control system. The controlling node sends one or more Request messages S82 to the controlled process node 70, the request message(s):
  requesting initiation of the MTC controller link quality definition procedure in the controlled process node;
  requesting process characteristics information from the controlled process node; and
  requesting Networked Control System, NCS, requirement information from the controlled process node.

The Request Message S82 carries information elements capable of encoding at least one or more of:
  UE identity
  Initiation indicator
  List of requested process characteristics parameters
    Cross over frequency
    Dominating time constant
    Delay, separate for each signal
    Nonlinearity, separate for each signal
    Range, separately for each signal
    Parameters of the transfer function(s) of the process
    Parameters of the differential equation(s) of the process
  List of requested NCS requirement parameters
    Closed loop bandwidth
    Closed loop static error
    Static disturbance suppression
    Parameters of the required sensitivity transfer function
    Parameters of the required complementary sensitivity transfer function.

The controlled process node performs a measure M84 of determining if the configuration process can be initiated. When the configuration process is initiated, the controlled process node, retrieves parameters as requested in the received Request message where possible, i.e., retrieving relevant process characteristics and NCS requirements available to the controlled process node.

The controlled process node 70 sends a Response Message S88 comprising an indication that initiation of the configuration process has been successful together with process characteristic information and NCS requirements information as available. In a case where the configuration process cannot be started, the response message will instead comprise a failure indication.

The Response Message S88 carries information elements capable of encoding at least one or more of:
  UE identity
  Success/failure indicator (optional)
  List of reported process characteristics parameters (optional)
    Cross over frequency
    Dominating time constant
    Delay, separate for each signal
    Nonlinearity, separate for each signal
    Range, separately for each signal
    Parameters of the transfer function(s) of the process
    Parameters of the differential equation(s) of the process
  List of reported NCS requirement parameters
    Closed loop bandwidth
    Closed loop static error
    Static disturbance suppression
    Parameters of the required sensitivity transfer function
    Parameters of the required complementary sensitivity transfer function The controlling node may also optionally send an Additional Request Message S90 to an intermediary node, e.g., an NCS requirements repository storing control related parameters that do not require performance of measurements in the controlled process node. Following the optional receipt of an
  Additional Response Message S92, the controlling node performs the measures M94 of determining link capability requirements and M96 of customizing QoS parameters to enable initiation of the MTC wireless communication link and an automated control of a process in the controlled processed node using a networked control system.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

It should be noted that although terminology from 3GPP LTE has been used herein to explain the example embodiments, this should not be seen as limiting the scope of the example embodiments to only the aforementioned system. Other RATs, including LTE-advanced and the 5th generation mobile communication standard, may also benefit from the example embodiments disclosed herein.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of controlling nodes, controlled process nodes, corresponding methods, and computer program products. It should be appreciated that the example embodiments presented herein may be practiced in combination with each other.

The invention claimed is:

1. A method, performed in a controlling node for configuring a networked control system (NCS) comprising the controlling node, a controlled process node, and a wireless communication link configured for Machine Type Communication (MTC) between the controlling node and the controlled process node, the method comprising:
    obtaining process characteristics for an automated process performed in the controlled process node, wherein the process characteristics comprises at least one output signal from the automated process and a reference signal and wherein the process characteristics further comprises one or more transfer functions and/or one or more differential or difference equations;
    obtaining NCS requirements for automatic control of the automated process to be performed in the controlled process node, wherein the automatic control comprises feedback control of the output signal and wherein the NCS requirements comprises one or more of a closed loop bandwidth, wherein the closed loop bandwidth determines a response time with respect to changes in the reference signal, and a closed loop static error, wherein the closed loop static error determines control accuracy for a constant reference signal;
    determining link capability requirements for the MTC wireless communication link based on the obtained process characteristics and the obtained NCS requirements;
    customizing one or more quality of service (QoS) parameters of the MTC wireless communication link based on the determined link capability requirements,
    initiating the MTC wireless communication link between the controlling node and the controlled process node; and
    providing one or more control signals to the controlled process node based on one or more feedback signals received from the controlled process node.

2. The method of claim 1, wherein the automatic control of the automated process comprises feedforward control.

3. The method of claim 1, wherein obtaining the process characteristics comprises receiving the process characteristics from the controlled process node.

4. The method of claim 1, wherein obtaining the NCS requirements comprises receiving the NCS requirements from the controlled process node and/or from an NCS requirements repository having a communications interface to the controlling node.

5. The method of claim 1, wherein the process characteristics and the NCS requirements are retrieved over a wired and/or wireless communications interface.

6. The method of claim 1, wherein the process characteristics comprise one or more of a cross over frequency, a process delay, a non-linearity, and a range of inputs and outputs of the controlled process node.

7. The method of claim 1, wherein the NCS requirements comprise a static or dynamic closed loop disturbance suppression.

8. The method of claim 1, wherein the link capability requirements comprise one or more of a maximum delay of the MTC wireless communication link, a sampling period, a maximum block error rate, and a bandwidth/data rate of the MTC wireless communication link.

9. The method of claim 1, wherein the customizing comprises customizing Guaranteed Bit Rate (GBR) or non-Guaranteed Bit Rate (non-GBR), Priority Handling, Packet Delay Budget and/or Packet Error Loss rate.

10. A non-transitory computer readable storage medium, having stored thereon a computer program comprising computer program code which, when executed in a controlling node, causes the controlling node to execute the method according to claim 1.

11. A controlling node configured to support configuration of a networked control system NCS comprising the controlling node, a controlled process node, and wireless communication link configured for a Machine Type Communication (MTC) between the controlling node and the controlled process node, wherein the controlling node comprises:
    radio circuitry arranged for establishing the MTC wireless communication link;
    communications circuitry arranged to obtain process characteristics for an automated process to be performed in the controlled process node, wherein the process characteristics comprises at least one output signal from the automated process and a reference signal and wherein the process characteristics further comprises one or more transfer functions and/or one or more differential or difference equations and to obtain NCS requirements for automatic control of the automated process to be performed in the controlled process node, wherein the automatic control comprises feedback control of the output signal and wherein the NCS requirements comprises one or more of a closed loop bandwidth, wherein the closed loop bandwidth determines a response time with respect to changes in the reference signal, and a closed loop static error, wherein the closed loop static error determines control accuracy for a constant reference signal; and processing circuitry arranged to:
  determine link capability requirements for the MTC wireless communication link based on the obtained process characteristics and the obtained NCS requirements;
  customize one or more quality of service (QoS) parameters of the MTC wireless communication link based on the determined link capability requirements,
  initiate the MTC wireless communication link between the controlling node and the controlled process node; and
  provide one or more control signals to the controlled process node based on one or more feedback signals received from the controlled process node.

* * * * *